(12) United States Patent
Nguyen et al.

(10) Patent No.: US 7,398,825 B2
(45) Date of Patent: Jul. 15, 2008

(54) METHODS OF CONTROLLING SAND AND WATER PRODUCTION IN SUBTERRANEAN ZONES

(75) Inventors: Philip D. Nguyen, Duncan, OK (US); Ronald G. Dusterhoft, Katy, TX (US); Jim B. Surjaatmadja, Duncan, OK (US); Loyd E. East, Jr., Tomball, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 236 days.

(21) Appl. No.: 11/284,356

(22) Filed: Nov. 21, 2005

(65) Prior Publication Data

US 2006/0124309 A1 Jun. 15, 2006

Related U.S. Application Data

(63) Continuation-in-part of application No. 11/004,441, filed on Dec. 3, 2004, now Pat. No. 7,273,099.

(51) Int. Cl.
*E21B 33/138* (2006.01)
*E21B 43/267* (2006.01)

(52) U.S. Cl. .......... 166/280.1; 166/281; 166/290; 166/294; 166/295; 507/224; 507/225; 523/130

(58) Field of Classification Search .......... 166/290, 166/280.1, 280.2, 281, 294, 295, 297, 298; 507/224, 225; 523/130
See application file for complete search history.

(56) References Cited

U.S. PATENT DOCUMENTS

| | | | |
|---|---|---|---|
| 2,238,671 A | 4/1941 | Woodhouse | ............. 166/21 |
| 2,278,838 A | 4/1942 | Groote et al. | |
| 2,670,329 A | 2/1954 | Jones | |
| 2,689,244 A | 9/1954 | Jones | |
| 2,703,316 A | 3/1955 | Schneider | ............. 260/78.3 |
| 2,819,278 A | 1/1958 | De Groots et al. | |
| 2,843,573 A | 7/1958 | Melamed | |
| 2,863,832 A | 12/1958 | Perrine | ............. 252/8.55 |
| 2,869,642 A | 1/1959 | McKay et al. | |

(Continued)

FOREIGN PATENT DOCUMENTS

CA 2063877 5/2003

(Continued)

OTHER PUBLICATIONS

U.S. Appl. No. 10/763,800, filed Jan. 24, 2004, Eoff et al.

(Continued)

*Primary Examiner*—George Suchfield
(74) *Attorney, Agent, or Firm*—Robert A. Kent; Baker Botts LLP

(57) ABSTRACT

Methods for stabilizing portions of a subterranean formation and controlling the production of water from those subterranean formations. In one embodiment, the methods of the present invention comprise: providing a consolidating agent; introducing the consolidating agent into an unconsolidated portion of a subterranean formation using a fluid diversion tool; allowing the consolidating agent to at least partially consolidate the unconsolidated portion of the subterranean formation; providing a relative permeability modifier; introducing the relative permeability modifier into the subterranean formation using a fluid diversion tool; and allowing the relative permeability modifier to modify the relative permeability of at least a portion of the subterranean formation.

20 Claims, 2 Drawing Sheets

U.S. PATENT DOCUMENTS

| | | | |
|---|---|---|---|
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,047,067 A | 7/1962 | Williams et al. | 166/33 |
| 3,052,298 A * | 9/1962 | Malott | 166/290 |
| 3,065,247 A | 11/1962 | De Groots et al. | |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,215,199 A | 11/1965 | Dilgren | 166/38 |
| 3,251,415 A | 5/1966 | Bombardieri et al. | 166/42 |
| 3,251,778 A | 5/1966 | Dickson et al. | |
| 3,258,428 A | 6/1966 | Dickson et al. | |
| 3,265,512 A | 8/1966 | Dickson et al. | |
| 3,271,307 A | 9/1966 | Dickson et al. | |
| 3,272,650 A | 9/1966 | MacVittie | 134/7 |
| 3,297,086 A | 1/1967 | Spain | 166/33 |
| 3,297,090 A | 1/1967 | Dilgren | 166/38 |
| 3,307,630 A | 3/1967 | Dilgren et al. | 166/38 |
| 3,308,885 A | 3/1967 | Sandiford | 166/33 |
| 3,316,965 A | 5/1967 | Watanabe | 166/33 |
| 3,326,890 A | 6/1967 | Engelskirchen et al. | |
| 3,336,980 A | 8/1967 | Rike | |
| 3,347,789 A | 10/1967 | Dickson et al. | |
| 3,375,872 A | 4/1968 | McLaughlin et al. | 166/29 |
| 3,382,924 A | 5/1968 | Veley et al. | 166/42 |
| 3,404,114 A | 10/1968 | Snyder et al. | |
| 3,404,735 A | 10/1968 | Young et al. | 166/33 |
| 3,415,320 A | 12/1968 | Young | 166/33 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A * | 1/1970 | Love et al. | 166/290 |
| 3,492,147 A | 1/1970 | Young et al. | 117/62.2 |
| 3,601,194 A | 8/1971 | Gallus | |
| 3,647,507 A | 3/1972 | Ashcraft | |
| 3,647,567 A | 3/1972 | Schweri | |
| 3,659,651 A | 5/1972 | Graham | 166/280 |
| 3,681,287 A | 8/1972 | Brown et al. | 260/67 |
| 3,689,418 A | 9/1972 | Cenci et al. | |
| 3,689,468 A | 9/1972 | Warminster | |
| 3,708,013 A | 1/1973 | Dismukes | |
| 3,709,298 A | 1/1973 | Pramann | |
| 3,744,566 A | 7/1973 | Szabo et al. | 166/275 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,902,557 A | 9/1975 | Shaughnessy et al. | |
| 3,910,862 A | 10/1975 | Barabas et al. | 260/79.3 MU |
| 3,912,692 A | 10/1975 | Casey et al. | 260/78.3 |
| 3,943,060 A | 3/1976 | Martin et al. | |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 3,983,941 A | 10/1976 | Fitch | |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,052,343 A | 10/1977 | Cunningham | |
| 4,052,345 A | 10/1977 | Austin et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman et al. | 166/295 |
| 4,127,173 A | 11/1978 | Watkins et al. | 166/276 |
| 4,129,183 A | 12/1978 | Kalfoglou | 166/300 |
| 4,129,534 A | 12/1978 | Cunningham | |
| 4,142,595 A | 3/1979 | Anderson et al. | 175/72 |
| 4,152,274 A | 5/1979 | Phillips et al. | |
| 4,158,521 A | 6/1979 | Anderson et al. | 405/264 |
| 4,158,726 A | 6/1979 | Kamada et al. | 526/200 |
| 4,169,798 A | 10/1979 | DeMartino | 252/8.55 R |
| 4,172,066 A | 10/1979 | Zweigle et al. | 260/29.6 TA |
| 4,228,277 A | 10/1980 | Landoll | |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,299,710 A | 11/1981 | Dupre et al. | 252/8.5 A |
| 4,305,463 A | 12/1981 | Zakiewicz | 106/245 |
| 4,306,981 A | 12/1981 | Blair, Jr. | |
| 4,336,842 A | 6/1982 | Graham et al. | 166/276 |
| 4,337,828 A | 7/1982 | Blair, Jr. | |
| 4,352,674 A | 10/1982 | Fery | 23/230 |
| 4,353,806 A | 10/1982 | Canter et al. | 507/229 |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,387,769 A | 6/1983 | Erbstoesser et al. | 166/295 |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,415,805 A | 11/1983 | Fertl et al. | 250/260 |
| 4,439,334 A | 3/1984 | Borchardt | 252/8.55 D |
| 4,439,489 A | 3/1984 | Johnson et al. | 428/404 |
| 4,440,649 A | 4/1984 | Loftin et al. | 252/8.5 C |
| 4,441,556 A * | 4/1984 | Powers et al. | 166/290 |
| 4,443,347 A | 4/1984 | Underdown et al. | 252/8.55 R |
| 4,447,342 A | 5/1984 | Borchardt et al. | 252/8.55 D |
| 4,460,052 A | 7/1984 | Gockel | 175/72 |
| 4,460,627 A | 7/1984 | Weaver et al. | 427/212 |
| 4,462,718 A | 7/1984 | McLaughlin et al. | 405/264 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,499,214 A | 2/1985 | Sortwell | |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,532,052 A | 7/1985 | Weaver et al. | 252/8.55 R |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,554,081 A | 11/1985 | Borchardt et al. | 252/8.5 A |
| 4,563,292 A | 1/1986 | Borchardt | 252/8.55 R |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,604,216 A | 8/1986 | Irvin et al. | 252/8.51 |
| 4,608,139 A | 8/1986 | Craun et al. | |
| 4,619,776 A | 10/1986 | Mondshine | |
| 4,627,926 A | 12/1986 | Peiffer et al. | 252/8.55 R |
| 4,649,998 A | 3/1987 | Friedman | 166/294 |
| 4,662,448 A * | 5/1987 | Ashford et al. | 166/290 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,671,883 A | 6/1987 | Connell | 252/8.515 |
| 4,675,140 A | 6/1987 | Sparks et al. | 264/4.3 |

| Patent | Date | Inventor | Class |
|---|---|---|---|
| 4,683,954 A | 8/1987 | Walker et al. | 166/307 |
| 4,693,639 A | 9/1987 | Hollenbeak et al. | 405/263 |
| 4,694,905 A | 9/1987 | Armbruster | 166/280 |
| 4,699,722 A | 10/1987 | Dymond et al. | 252/8.551 |
| 4,702,319 A | 10/1987 | Bock et al. | |
| 4,715,967 A | 12/1987 | Bellis | 252/8.551 |
| 4,716,964 A | 1/1988 | Erbstoesser et al. | 166/284 |
| 4,730,028 A | 3/1988 | Bock et al. | 526/225 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,814,096 A | 3/1989 | Evani | |
| 4,817,721 A | 4/1989 | Pober | 166/295 |
| 4,828,725 A | 5/1989 | Lai et al. | |
| 4,828,726 A | 5/1989 | Himes et al. | 252/8.553 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,856,590 A | 8/1989 | Caillier | |
| 4,870,167 A | 9/1989 | Zody et al. | |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,941,537 A | 7/1990 | Langemeier et al. | |
| 4,942,186 A | 7/1990 | Murphey et al. | 523/131 |
| 4,956,104 A | 9/1990 | Cowan et al. | |
| 4,957,165 A | 9/1990 | Cantu et al. | 166/295 |
| 4,959,432 A | 9/1990 | Fan et al. | 526/287 |
| 4,960,876 A | 10/1990 | Molteni et al. | |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,051,197 A | 9/1991 | Kalfayan et al. | |
| 5,071,934 A | 12/1991 | Peiffer | 526/307 |
| 5,082,056 A | 1/1992 | Tackett, Jr. | 166/295 |
| 5,097,904 A | 3/1992 | Himes | 166/294 |
| 5,105,886 A | 4/1992 | Strubhar et al. | |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,146,986 A | 9/1992 | Dalrymple | 166/294 |
| 5,160,642 A | 11/1992 | Schield et al. | 252/8.551 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,197,544 A | 3/1993 | Himes | 166/294 |
| 5,199,491 A | 4/1993 | Kutta et al. | 166/276 |
| 5,199,492 A | 4/1993 | Surles et al. | 166/295 |
| 5,208,216 A | 5/1993 | Williamson et al. | 507/120 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,042 A | 9/1993 | Dovan et al. | 166/270 |
| 5,247,059 A | 9/1993 | Gruber et al. | 528/354 |
| 5,248,665 A | 9/1993 | Hale et al. | |
| 5,249,628 A | 10/1993 | Surjaatmadja | 166/305 |
| 5,256,651 A | 10/1993 | Phelps et al. | |
| 5,256,729 A | 10/1993 | Kutts et al. | 524/700 |
| 5,271,466 A | 12/1993 | Harms | 166/300 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,342,530 A | 8/1994 | Aften et al. | 252/8.551 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,379,841 A | 1/1995 | Pusch et al. | 166/295 |
| 5,381,864 A | 1/1995 | Nguyen et al. | 166/280 |
| 5,382,371 A | 1/1995 | Stahl et al. | 507/221 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,424,284 A | 6/1995 | Patel et al. | |
| 5,439,055 A | 8/1995 | Card et al. | 166/280 |
| 5,445,223 A | 8/1995 | Nelson et al. | |
| 5,460,226 A | 10/1995 | Lawton et al. | 166/300 |
| 5,464,060 A | 11/1995 | Hale et al. | 166/293 |
| 5,473,059 A | 12/1995 | Yeh | |
| 5,475,080 A | 12/1995 | Gruber et al. | 528/354 |
| 5,484,881 A | 1/1996 | Gruber et al. | 528/54 |
| 5,494,103 A | 2/1996 | Surjaatmadja et al. | 166/222 |
| 5,494,178 A | 2/1996 | Nguyen et al. | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,783 A | 1/1997 | Audibert et al. | 507/120 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |

| | | | | | | | |
|---|---|---|---|---|---|---|---|
| 5,607,902 A | 3/1997 | Smith et al. | 507/120 | 6,006,835 A | 12/1999 | Onan et al. | 166/295 |
| 5,609,207 A | 3/1997 | Dewprashad et al. | 166/276 | 6,006,836 A | 12/1999 | Chatterji et al. | 166/295 |
| 5,620,049 A | 4/1997 | Gipson et al. | 166/248 | 6,012,524 A | 1/2000 | Chatterji et al. | 166/295 |
| 5,637,556 A | 6/1997 | Argillier et al. | 507/120 | 6,016,870 A | 1/2000 | Dewprashad et al. | 166/295 |
| 5,639,806 A | 6/1997 | Johnson et al. | 523/208 | 6,020,289 A | 2/2000 | Dymond | 507/120 |
| 5,643,460 A | 7/1997 | Marble et al. | | 6,024,170 A | 2/2000 | McCabe et al. | 166/300 |
| 5,646,093 A | 7/1997 | Dino | 507/209 | 6,028,113 A | 2/2000 | Scepanski | 514/643 |
| 5,669,456 A | 9/1997 | Audibert et al. | 175/72 | 6,028,534 A | 2/2000 | Ciglenec et al. | 340/856.2 |
| 5,670,473 A | 9/1997 | Scepanski | 510/445 | 6,040,398 A | 3/2000 | Kinsho et al. | 525/527 |
| 5,681,796 A | 10/1997 | Nimerick | | 6,047,772 A | 4/2000 | Weaver et al. | 166/276 |
| 5,692,566 A | 12/1997 | Surles | 166/295 | 6,059,034 A | 5/2000 | Rickards et al. | 166/280 |
| 5,697,440 A | 12/1997 | Weaver et al. | 166/281 | 6,059,035 A | 5/2000 | Chatterji et al. | 166/293 |
| 5,698,322 A | 12/1997 | Tsai et al. | 428/373 | 6,059,036 A | 5/2000 | Chatterji et al. | 166/294 |
| 5,704,426 A | 1/1998 | Rytlewski et al. | | 6,068,055 A | 5/2000 | Chatterji et al. | 166/293 |
| 5,712,314 A | 1/1998 | Surles et al. | 521/41 | 6,069,117 A | 5/2000 | Onan et al. | 507/202 |
| 5,720,347 A | 2/1998 | Audibert et al. | 166/294 | 6,070,664 A | 6/2000 | Dalrymple et al. | 166/281 |
| 5,728,653 A | 3/1998 | Audibert et al. | 507/222 | 6,074,739 A | 6/2000 | Katagiri | 428/323 |
| 5,732,364 A | 3/1998 | Kalb et al. | 588/8 | 6,079,492 A | 6/2000 | Hoogteijling et al. | 166/276 |
| 5,735,349 A | 4/1998 | Dawson et al. | 166/295 | 6,098,711 A | 8/2000 | Chatterji et al. | 166/294 |
| 5,765,642 A | 6/1998 | Surjaatmadja | 166/297 | 6,114,410 A | 9/2000 | Betzold | 523/130 |
| 5,775,425 A | 7/1998 | Weaver et al. | 166/276 | 6,123,871 A | 9/2000 | Carroll | 252/301.36 |
| 5,782,300 A | 7/1998 | James et al. | 166/278 | 6,123,965 A | 9/2000 | Jacon et al. | 424/489 |
| 5,783,822 A | 7/1998 | Buchanan et al. | 250/259 | 6,124,245 A | 9/2000 | Patel | 507/120 |
| 5,787,986 A | 8/1998 | Weaver et al. | 166/280 | 6,124,246 A | 9/2000 | Heathman et al. | 507/219 |
| 5,791,415 A | 8/1998 | Nguyen et al. | 166/280 | 6,130,286 A | 10/2000 | Thomas et al. | 524/507 |
| 5,799,734 A | 9/1998 | Norman et al. | 166/278 | 6,135,987 A | 10/2000 | Tsai et al. | 604/365 |
| 5,806,593 A | 9/1998 | Suries | 166/270 | 6,140,446 A | 10/2000 | Fujiki et al. | 528/15 |
| 5,830,987 A | 11/1998 | Smith | 528/332 | 6,148,911 A | 11/2000 | Gipson et al. | 166/248 |
| 5,833,000 A | 11/1998 | Weaver et al. | 166/276 | 6,152,234 A | 11/2000 | Newhouse et al. | 166/403 |
| 5,833,361 A | 11/1998 | Funk | 366/80 | 6,162,766 A | 12/2000 | Muir et al. | 507/267 |
| 5,836,391 A | 11/1998 | Jonasson et al. | 166/295 | 6,169,058 B1 | 1/2001 | Le et al. | 507/222 |
| 5,836,392 A | 11/1998 | Urlwin-Smith | 166/295 | 6,172,011 B1 | 1/2001 | Card et al. | 507/204 |
| 5,837,656 A | 11/1998 | Sinclair et al. | 507/220 | 6,172,077 B1 | 1/2001 | Curtis et al. | 514/278 |
| 5,837,785 A | 11/1998 | Kinsho et al. | 525/527 | 6,176,315 B1 | 1/2001 | Reddy et al. | 166/295 |
| 5,839,510 A | 11/1998 | Weaver et al. | 166/276 | 6,177,484 B1 | 1/2001 | Surles | 523/131 |
| 5,840,784 A | 11/1998 | Funkhouser et al. | 523/130 | 6,184,311 B1 | 2/2001 | O'Keefe et al. | 525/438 |
| 5,849,401 A | 12/1998 | El-Afandi et al. | 428/215 | 6,187,834 B1 | 2/2001 | Thayer et al. | 522/15 |
| 5,849,590 A | 12/1998 | Anderson, II et al. | 436/27 | 6,187,839 B1 | 2/2001 | Eoff et al. | 523/130 |
| 5,853,048 A | 12/1998 | Weaver et al. | 166/279 | 6,189,615 B1 | 2/2001 | Sydansk | 166/270 |
| 5,864,003 A | 1/1999 | Qureshi et al. | 528/141 | 6,192,985 B1 | 2/2001 | Hinkel et al. | 166/280 |
| 5,865,936 A | 2/1999 | Edelman et al. | 156/310 | 6,192,986 B1 | 2/2001 | Urlwin-Smith | 166/295 |
| 5,871,049 A | 2/1999 | Weaver et al. | 166/276 | 6,194,356 B1 | 2/2001 | Jones et al. | |
| 5,873,413 A | 2/1999 | Chatterji et al. | 166/293 | 6,196,317 B1 | 3/2001 | Hardy | 166/295 |
| 5,875,844 A | 3/1999 | Chatterji et al. | 166/293 | 6,202,751 B1 | 3/2001 | Chatterji et al. | 166/276 |
| 5,875,845 A | 3/1999 | Chatterji et al. | 166/293 | 6,209,643 B1 | 4/2001 | Nguyen et al. | 166/276 |
| 5,875,846 A | 3/1999 | Chatterji et al. | 166/293 | 6,209,644 B1 | 4/2001 | Brunet | 166/297 |
| 5,887,653 A | 3/1999 | Bishop et al. | 166/281 | 6,209,646 B1 | 4/2001 | Reddy et al. | 166/300 |
| 5,893,383 A | 4/1999 | Fracteau | 137/14 | 6,210,471 B1 | 4/2001 | Craig | 106/31.08 |
| 5,893,416 A | 4/1999 | Read | 166/304 | 6,214,773 B1 | 4/2001 | Harris et al. | 507/271 |
| 5,908,073 A | 6/1999 | Nguyen et al. | 166/276 | 6,228,812 B1 | 5/2001 | Dawson et al. | 507/221 |
| 5,908,814 A | 6/1999 | Patel et al. | | 6,231,644 B1 | 5/2001 | Chatterji et al. | 106/724 |
| 5,911,282 A | 6/1999 | Onan et al. | 175/72 | 6,234,251 B1 | 5/2001 | Chatterji et al. | 166/295 |
| 5,916,933 A | 6/1999 | Johnson et al. | 523/208 | 6,237,687 B1 | 5/2001 | Barbee, Jr. et al. | 166/278 |
| 5,921,317 A | 7/1999 | Dewprashad et al. | 166/208 | 6,238,597 B1 | 5/2001 | Yim et al. | 252/512 |
| 5,924,488 A | 7/1999 | Nguyen et al. | 166/280 | 6,241,019 B1 | 6/2001 | Davidson et al. | 166/249 |
| 5,929,437 A | 7/1999 | Elliott et al. | 250/259 | 6,242,390 B1 | 6/2001 | Mitchell et al. | 507/211 |
| 5,944,105 A | 8/1999 | Nguyen | 166/278 | 6,244,344 B1 | 6/2001 | Chatterji et al. | 166/295 |
| 5,944,106 A | 8/1999 | Dalrymple et al. | 166/294 | 6,253,851 B1 | 7/2001 | Schroeder, Jr. et al. | 166/278 |
| 5,945,387 A | 8/1999 | Chatterji et al. | 507/224 | 6,257,335 B1 | 7/2001 | Nguyen et al. | 166/280 |
| 5,948,734 A | 9/1999 | Sinclair et al. | 507/219 | 6,260,622 B1 | 7/2001 | Blok et al. | 166/305.1 |
| 5,957,204 A | 9/1999 | Chatterji et al. | 166/295 | 6,271,181 B1 | 8/2001 | Chatterji et al. | 507/219 |
| 5,960,877 A | 10/1999 | Funkhouser et al. | 166/270 | 6,274,650 B1 | 8/2001 | Cui | 523/457 |
| 5,960,880 A | 10/1999 | Nguyen et al. | 166/280 | 6,277,900 B1 | 8/2001 | Oswald et al. | 523/130 |
| 5,964,291 A | 10/1999 | Bourne et al. | 166/279 | 6,279,652 B1 | 8/2001 | Chatterji et al. | 166/194 |
| 5,969,006 A | 10/1999 | Onan et al. | 523/166 | 6,279,656 B1 | 8/2001 | Sinclair et al. | 166/310 |
| 5,972,848 A | 10/1999 | Audibert et al. | 507/119 | 6,281,172 B1 | 8/2001 | Warren et al. | |
| 5,977,283 A | 11/1999 | Rossitto | 528/44 | 6,283,210 B1 | 9/2001 | Soliman et al. | 166/270 |
| 5,979,557 A | 11/1999 | Card et al. | 166/300 | 6,283,214 B1 | 9/2001 | Guinot et al. | 166/297 |
| 5,990,052 A | 11/1999 | Harris | | 6,291,404 B2 | 9/2001 | House | |
| 5,994,785 A | 11/1999 | Higuchi et al. | 527/789 | 6,302,207 B1 | 10/2001 | Nguyen et al. | 166/276 |
| RE36,466 E | 12/1999 | Nelson et al. | 166/280 | 6,306,998 B1 | 10/2001 | Kimura et al. | 528/12 |
| 6,003,600 A | 12/1999 | Nguyen et al. | 166/281 | 6,311,773 B1 | 11/2001 | Todd et al. | 166/280.2 |
| 6,004,400 A | 12/1999 | Bishop et al. | 134/2 | 6,321,841 B1 | 11/2001 | Eoff et al. | 166/291 |

| Patent No. | Date | Inventor | Class |
|---|---|---|---|
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,358,889 B2 | 3/2002 | Waggenspack et al. | |
| 6,359,047 B1 | 3/2002 | Thieu et al. | 524/376 |
| 6,364,016 B1 | 4/2002 | Dalrymple et al. | 166/270 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,380,137 B1 | 4/2002 | Heier et al. | 507/121 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,476,169 B1 | 11/2002 | Eoff et al. | 526/307.2 |
| 6,476,283 B1 | 11/2002 | Devore et al. | 585/250 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,497,283 B1 | 12/2002 | Eoff et al. | 166/293 |
| 6,503,870 B2 | 1/2003 | Griffith et al. | 507/219 |
| 6,508,305 B1 | 1/2003 | Brannon et al. | 166/293 |
| 6,516,885 B1 | 2/2003 | Munday | 166/295 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,562,762 B2 | 5/2003 | Cowan et al. | |
| 6,569,814 B1 | 5/2003 | Brady et al. | 507/201 |
| 6,569,983 B1 | 5/2003 | Treybig et al. | 528/102 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,601,648 B2 | 8/2003 | Ebinger | |
| 6,607,035 B1 | 8/2003 | Reddy et al. | |
| 6,608,162 B1 | 8/2003 | Chiu et al. | 528/129 |
| 6,609,578 B2 | 8/2003 | Patel et al. | 175/64 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | 507/202 |
| 6,632,892 B2 | 10/2003 | Rubinsztajn et al. | 525/476 |
| 6,637,517 B2 | 10/2003 | Qu et al. | |
| 6,642,309 B2 | 11/2003 | Komitsu et al. | 525/100 |
| 6,648,501 B2 | 11/2003 | Huber et al. | 366/301 |
| 6,656,885 B2 | 12/2003 | House et al. | |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,710,107 B2 | 3/2004 | Audibert et al. | 524/5 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,743,288 B2 | 6/2004 | Eoff et al. | |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,764,981 B1 | 7/2004 | Eoff et al. | 507/110 |
| 6,766,858 B2 | 7/2004 | Nguyen et al. | 166/300 |
| 6,767,867 B2 | 7/2004 | Chatterji et al. | |
| 6,767,869 B2 | 7/2004 | DiLullo et al. | |
| 6,776,236 B1 | 8/2004 | Nguyen | 166/279 |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,803,348 B2 | 10/2004 | Jones et al. | 507/221 |
| 6,832,650 B2 | 12/2004 | Nguyen et al. | 166/279 |
| 6,846,420 B2 | 1/2005 | Reddy et al. | |
| 6,851,474 B2 | 2/2005 | Nguyen | 166/279 |
| 6,884,760 B1 | 4/2005 | Brand et al. | |
| 6,887,834 B2 | 5/2005 | Nguyen et al. | 507/221 |
| 6,962,203 B2 | 11/2005 | Funchess | |
| 6,978,836 B2 | 12/2005 | Nguyen et al. | 166/295 |
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 * | 5/2006 | Nguyen | 166/280.1 |
| 7,091,159 B2 | 8/2006 | Eoff et al. | |
| 7,114,568 B2 | 10/2006 | Eoff et al. | |
| 7,117,942 B2 * | 10/2006 | Dalrymple et al. | 166/278 |
| 7,159,656 B2 | 1/2007 | Eoff et al. | |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,273,099 B2 * | 9/2007 | East et al. | 166/280.1 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0019627 A1 | 1/2003 | Qu et al. | 166/281 |
| 2003/0051876 A1 | 3/2003 | Tolman et al. | |
| 2003/0060374 A1 | 3/2003 | Cooke, Jr. | 507/200 |
| 2003/0114314 A1 | 6/2003 | Ballard et al. | 507/100 |
| 2003/0114317 A1 | 6/2003 | Benton, et al. | |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0191030 A1 | 10/2003 | Blair et al. | 507/225 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |

| | | | | | | |
|---|---|---|---|---|---|---|
| 2004/0040713 | A1 | 3/2004 | Nguyen et al. ............... 166/295 | EP | 1 193 365 A1 | 4/2002 |
| 2004/0045712 | A1 | 3/2004 | Eoff et al. ................... 166/293 | EP | 1 312 753 A1 | 5/2003 |
| 2004/0048752 | A1 | 3/2004 | Nguyen et al. ............... 507/269 | EP | 1326003 A1 | 7/2003 |
| 2004/0055747 | A1 | 3/2004 | Lee ............... 166/278 | EP | 1362978 A1 | 11/2003 |
| 2004/0102331 | A1 | 5/2004 | Chan et al. .................. 507/100 | EP | 1394355 A1 | 3/2004 |
| 2004/0106525 | A1 | 6/2004 | Willbert et al. ............ 507/200 | EP | 1396606 A2 | 3/2004 |
| 2004/0138068 | A1 | 7/2004 | Rimmer et al. ............. 507/100 | EP | 1398460 A1 | 3/2004 |
| 2004/0149441 | A1 | 8/2004 | Nguyen et al. ........... 166/280.1 | EP | 1403466 A2 | 3/2004 |
| 2004/0152601 | A1 | 8/2004 | Still et al. ................... 507/100 | EP | 1464789 A1 | 10/2004 |
| 2004/0171495 | A1 | 9/2004 | Zamora et al. ............. 507/100 | GB | 1107584 | 4/1965 |
| 2004/0177961 | A1 | 9/2004 | Nguyen et al. ........... 166/280.2 | GB | 1264180 | 12/1969 |
| 2004/0194961 | A1 | 10/2004 | Nguyen et al. ............... 166/295 | GB | 1292718 | 10/1972 |
| 2004/0206499 | A1 | 10/2004 | Nguyen et al. ........... 166/280.2 | GB | 2 221 940 A | 2/1990 |
| 2004/0211559 | A1 | 10/2004 | Nguyen et al. ............... 166/276 | GB | 2 335 428 A | 9/1999 |
| 2004/0211561 | A1 | 10/2004 | Nguyen et al. ........... 166/280.2 | GB | 2382143 A | 4/2001 |
| 2004/0220058 | A1 | 11/2004 | Eoff et al. ................... 507/200 | WO | WO 93/15127 | 8/1993 |
| 2004/0221992 | A1 | 11/2004 | Nguyen et al. ............... 166/295 | WO | WO 94/07949 | 4/1994 |
| 2004/0229756 | A1 | 11/2004 | Eoff et al. ................... 507/219 | WO | WO 94/08078 | 4/1994 |
| 2004/0229757 | A1 | 11/2004 | Eoff et al. ................... 507/219 | WO | WO 94/08090 | 4/1994 |
| 2004/0231845 | A1 | 11/2004 | Cooke, Jr. ................... 166/279 | WO | WO 95/09879 | 4/1995 |
| 2004/0231847 | A1 | 11/2004 | Nguyen et al. ............... 166/295 | WO | WO 97/11845 | 4/1997 |
| 2004/0256097 | A1 | 12/2004 | Byrd et al. .................. 166/90.1 | WO | WO 99/27229 | 6/1999 |
| 2004/0256099 | A1 | 12/2004 | Nguyen et al. | WO | WO 99/49183 | 9/1999 |
| 2004/0261995 | A1 | 12/2004 | Nguyen et al. ............... 166/279 | WO | WO 99/50530 | 10/1999 |
| 2004/0261997 | A1 | 12/2004 | Nguyen et al. ............... 166/281 | WO | WO 00/78890 | 12/2000 |
| 2005/0000694 | A1 | 1/2005 | Dalrymple et al. .......... 166/307 | WO | WO 01/81914 | 11/2001 |
| 2005/0000731 | A1 | 1/2005 | Nguyen et al. ................. 175/57 | WO | WO 01/87797 A1 | 11/2001 |
| 2005/0006093 | A1 | 1/2005 | Nguyen et al. ............... 166/281 | WO | WO 02/12674 A1 | 2/2002 |
| 2005/0006095 | A1 | 1/2005 | Justus et al. ................ 166/295 | WO | WO 02/097236 A1 | 12/2002 |
| 2005/0006096 | A1 | 1/2005 | Nguyen et al. ............... 166/295 | WO | WO 03/027431 A1 | 4/2003 |
| 2005/0034862 | A1 | 2/2005 | Nguyen ....................... 166/281 | WO | WO 03/027431 A2 | 4/2003 |
| 2005/0045326 | A1 | 3/2005 | Nguyen ....................... 166/278 | WO | WO 03/056130 | 7/2003 |
| 2005/0045330 | A1 | 3/2005 | Nguyen et al. ............... 166/281 | WO | WO 2004/022667 A | 3/2004 |
| 2005/0045384 | A1 | 3/2005 | Nguyen ....................... 175/72 | WO | WO 2004/037946 A1 | 5/2004 |
| 2005/0051322 | A1 | 3/2005 | Nguyen et al. ............... 166/281 | WO | WO 2004/038176 A1 | 5/2004 |
| 2005/0051331 | A1 | 3/2005 | Nguyen et al. ........... 166/280.2 | WO | WO 2004/094781 | 11/2004 |
| 2005/0059555 | A1 | 3/2005 | Dusterhoft et al. .......... 507/100 | WO | WO 2004/101706 A1 | 11/2004 |
| 2005/0061509 | A1 | 3/2005 | Nguyen ....................... 166/307 | WO | WO 2005/021928 A2 | 3/2005 |
| 2005/0092489 | A1 | 5/2005 | Welton et al. ............ 166/280.2 | | | |
| 2005/0145385 | A1 | 7/2005 | Nguyen ....................... 166/279 | | OTHER PUBLICATIONS | |
| 2005/0173116 | A1 | 8/2005 | Nguyen et al. ........... 166/280.2 | | | |
| 2005/0178551 | A1 | 8/2005 | Tolman et al. | | | |
| 2005/0194142 | A1 | 9/2005 | Nguyen ................... 166/280.2 | | | |
| 2005/0197258 | A1 | 9/2005 | Nguyen ....................... 507/209 | | | |
| 2005/0230114 | A1 | 10/2005 | Eoff et al. | | | |
| 2005/0230116 | A1 | 10/2005 | Eoff et al. ................. 166/305.1 | | | |
| 2005/0263283 | A1 | 12/2005 | Nguyen ....................... 166/281 | | | |
| 2005/0269086 | A1 | 12/2005 | Nguyen et al. ............... 166/281 | | | |
| 2005/0274510 | A1 | 12/2005 | Nguyen et al. ......... 166/250.12 | | | |
| 2005/0274517 | A1 | 12/2005 | Blauch et al. ............ 166/280.2 | | | |
| 2005/0277554 | A1 | 12/2005 | Blauch et al. ................ 507/224 | | | |
| 2005/0284632 | A1 | 12/2005 | Dalrymple et al. | | | |
| 2005/0284637 | A1 | 12/2005 | Stegent et al. ............ 166/308.1 | | | |
| 2007/0012445 | A1* | 1/2007 | Nguyen et al. ............... 166/281 | | | |
| 2007/0029087 | A1* | 2/2007 | Nguyen et al. ............... 166/281 | | | |
| 2007/0114032 | A1* | 5/2007 | Stegent et al. ................ 166/287 | | | |

FOREIGN PATENT DOCUMENTS

| | | |
|---|---|---|
| DE | 2 250 552 | 4/1974 |
| EP | 0313243 B1 | 10/1988 |
| EP | 0 383 337 A2 | 8/1990 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0 896 122 A2 | 2/1999 |
| EP | 0933498 A1 | 8/1999 |
| EP | 1001133 A1 | 5/2000 |
| EP | 1132569 A2 | 9/2001 |

OTHER PUBLICATIONS

U.S. Appl. No. 10/780,995, filed Feb. 18, 2004, Eoff et al.
U.S. Appl. No. 10/806,894, filed Mar. 23, 2004, Eoff et al.
U.S. Appl. No. 10/825,001, filed Apr. 15, 2004, Eoff et al.
U.S. Appl. No. 10/872,997, filed Jun. 21, 2004, Eoff et al.
U.S. Appl. No. 10/881,198, filed Jun. 29, 2004, Dalrymple et al.
U.S. Appl. No. 10/893,210, filed Jul. 16, 2004, Eoff et al.
U.S. Appl. No. 11/102,062, filed Apr. 8, 2005, Sierra et al.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.
Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.
Inikori, Solomon Ovueferaye, *Numerical Study of Water Coning Control with Downhole Water Sink (DWS) Well Completions in Vertical and Horizontal Wells*, A Dissertation, Aug. 2002, Title page, Contents, Abstract and pp. 17-18, Submitted to the Graduate Faculty of the Louisiana State University and Agricultural and Mechanical College, The Department of Petroleum Engineering.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Produc-*

*tion*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

U.S. Appl. No. 10/793,711, filed Mar. 5, 2004, Nguyen et al.
U.S. Appl. No. 10/864,061, filed Jun. 9, 2004, Nguyen et al.
U.S. Appl. No. 10/864,618, filed Jun. 9, 2004, Nguyen et al.
U.S. Appl. No. 11/004,441, filed Dec. 3, 2004, East et al.
U.S. Appl. No. 11/183,028, Nguyen et al.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000, printed from website @ http://speonline.spe.org.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000, printed from website @ http://speonline.spe.org.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002, printed from website @ http://speonline.spe.org.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003, printed from website @ http://speonline.spe.org.

Xu, et al., *Modeling of Laser Spallation Drilling of Rocks for Gas—and Oilwell Drilling*, SPE 95746, 2005, Society of Petroleum Engineers Inc., presented at the 2005 SPE Annual Technical Conference and Exhibition held in Dallas, Texas, Oct. 9-12, 2005, printed from website @ http://speonline.spe.org.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.

Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004, printed from website @ http://speonline.spe.org.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005, printed from website @ http://speonline.spe.org.

U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/727,365, filed Dec. 4, 2003, Reddy et al.
U.S. Appl. No. 10/853,879, filed May 26, 2004, Nguyen et al.
U.S. Appl. No. 10/861,829, filed Jun. 04, 2004, Stegent et al.
U.S. Appl. No. 10/868,593, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen
U.S. Appl. No. 11/056,635, filed Feb. 11, 2005, Dusterhoft et al.

Halliburton, *CoalStim$^{SM}$ Service, Helps Boost Cash Flow From CBM Assets*, Stimulation, HO3679 Oct. 2003, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages.

Halliburton "*CobraFrac$^{SM}$ Service, Coiled Tubing Fracturing—Cost-Effective Method for Stimulating Untapped Reserves*", 2 pages, 2004.

Halliburton "*CobraJetFrac$^{SM}$ Service, Cost-Effective Technology That Can Help Reduce Cost per BOE Produced, Shorten Cycle time and Reduce Capex*".

Halliburton Cobra Frac Advertisement, 2001.

Halliburton "*SurgiFrac$^{SM}$ Service, a Quick and cost-Effective Method to Help Boost Production From Openhole Horizonal Completions*", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, pp. 1-138, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled Injectrol® A Component, 1999.

Halliburton brochure entitled "Injectrol® G Sealant", 1999.

Halliburton brochure entitled "Injectrol® IT Sealant", 1999.

Halliburton brochure entitled "Injectrol® Service Treatment", 1999.

Halliburton brochure entitled "Injectrol® U Sealant", 1999.

Halliburton brochure entitled "Sanfix® A Resin", 1999.

Foreign Search Reprot and Written Opinion for Internation Application No. PCT/GB2006/004102 Filed on Nov. 2, 2006 and Mailed on Feb. 20, 2007.

Notice of Allowance dated Feb. 16, 2007 from U.S. Appl. No. 11/004,441.

Office Action dated Oct. 19, 2006 from U.S. Appl. No. 11/004,441.

* cited by examiner

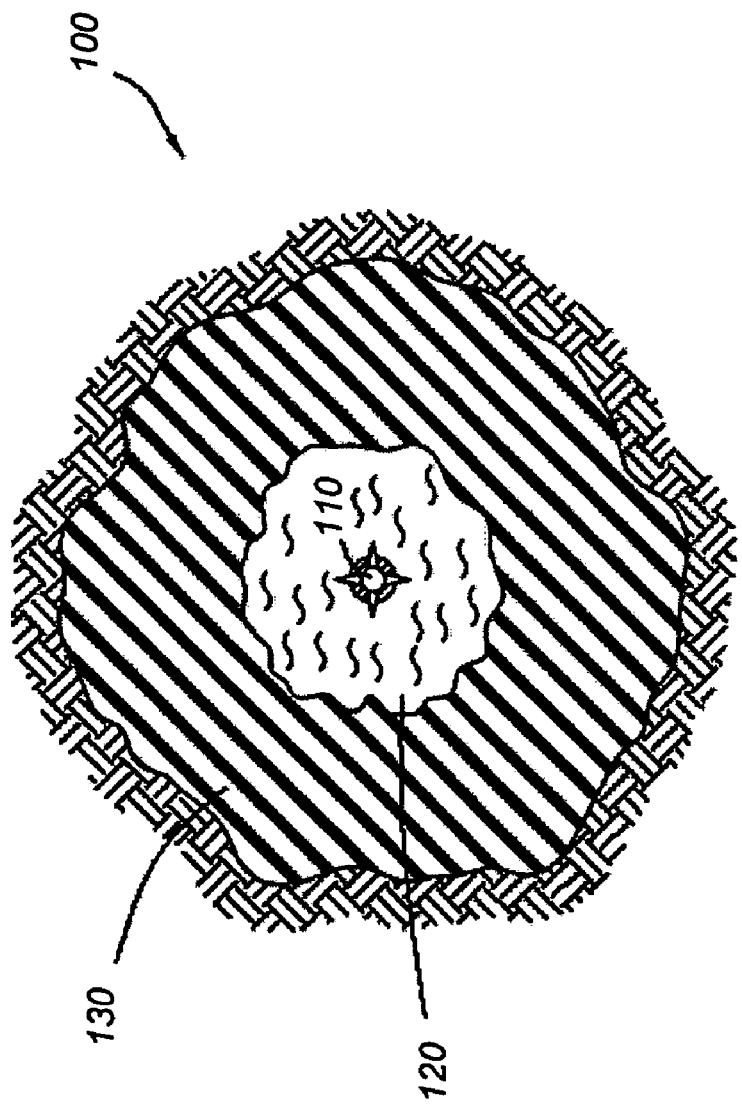

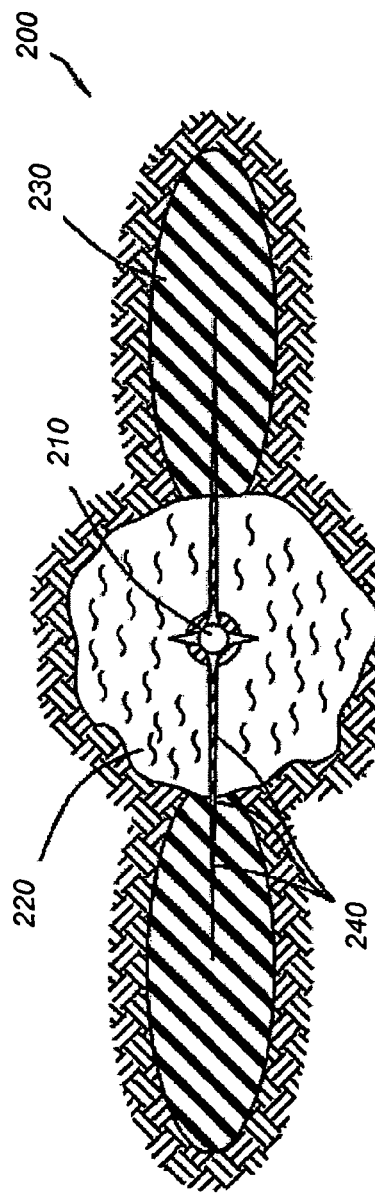
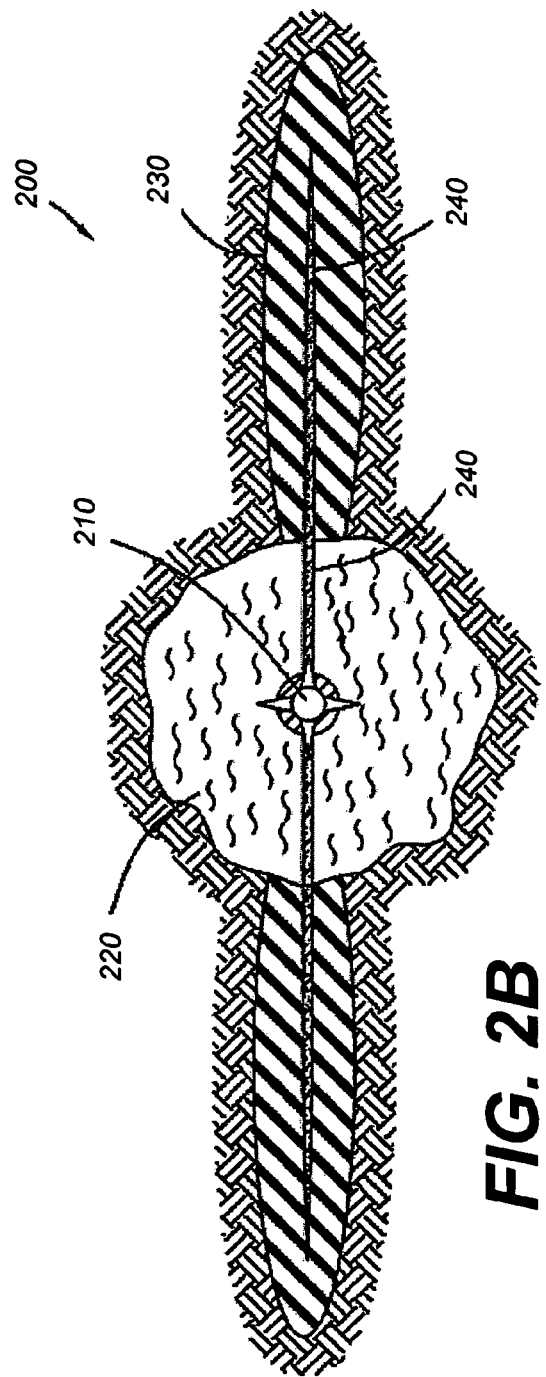

METHODS OF CONTROLLING SAND AND WATER PRODUCTION IN SUBTERRANEAN ZONES

CROSS-REFERENCE TO RELATED APPLICATIONS

This application is a continuation-in-part of U.S. patent application Ser. No. 11/004,441, filed Dec. 3, 2004, now U.S. Pat. No. 7,273,099 entitled "Methods for Controlling Water and Sand Production in Subterranean Wells," by East, Jr. et al., which is incorporated by reference herein for all purposes.

BACKGROUND

The present invention relates to the treatment of subterranean formations. More particularly, the present invention relates to methods for stabilizing portions of a subterranean formation and controlling the production of water from those subterranean formations.

Hydrocarbon wells are often located in subterranean formations that contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formations," "unconsolidated portions of a subterranean formation," and derivatives thereof are defined herein to include any formations that contain unconsolidated particulates, as that term is defined herein. "Unconsolidated subterranean formations," and "unconsolidated portions of a subterranean formation," as those terms are used herein, include subterranean fractures wherein unconsolidated particulates reside within the open space of the fracture (e.g., forming a proppant pack within the fracture).

One method of controlling particulates in such unconsolidated formations has been to produce fluids from the formations at low flow rates, so that the near well stability of sand bridges and the like may be substantially preserved. The collapse of such sand bridges, however, may nevertheless occur, possibly due to unintentionally high production rates and/or pressure cycling as may occur from repeated shut-ins and start ups of a well. The frequency of pressure cycling is critical to the longevity of the near well formation, especially during the depletion stage of the well when the pore pressure of the formation has already been significantly reduced.

Another method of controlling particulates in unconsolidated formations involves placing a filtration bed containing gravel (e.g., a "gravel pack") near the well bore to present a physical barrier to the transport of unconsolidated formation fines with the production of desired fluids. Typically, such "gravel-packing operations" involve the pumping and placement of a quantity of certain particulates into the unconsolidated formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. To install the gravel pack, the gravel is carried to the formation in the form of a slurry by mixing the gravel with a treatment fluid, which is usually viscosified. Once the gravel is placed in the well bore, the viscosity of the treatment fluid may be reduced, and it is returned to the surface. The resulting structure presents a barrier to migrating sand from the formation while still permitting fluid flow.

However, the use of such gravel-packing methods may be problematic. For example, gravel packs may be time consuming and expensive to install. Due to the time and expense needed, it is sometimes desirable to place a screen without the gravel. Even in circumstances in which it is practical to place a screen without gravel, it is often difficult to determine an appropriate screen size to use as formation sands tend to have a wide distribution of grain sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for gravel packing. However, expandable screens may still exhibit such problems as screen erosion and screen plugging.

Another method used to control particulates in unconsolidated formations involves consolidating unconsolidated particulates into stable, permeable masses by applying a consolidating agent (e.g., a resin or tackifying agent) to the subterranean formation. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging pore channels, halting pumping when the well bore is plugged with solid material, or resulting in a downhole explosion as a result of the heat of polymerization. Also, using these conventional processes to treat long intervals (e.g., over about 20 feet) of unconsolidated regions is not practical due to the difficulty in determining if the entire interval has been successfully treated with both the resin and the external catalyst. Further, conventional consolidation techniques have often resulted in limited or inadequate penetration distances of consolidating agent into formations.

Unconsolidated formation particulates also may migrate out of the formation when water is produced from the formation. This migration of formation particulates is due, in part, to the fact that most natural cementation between formation sand grains disintegrates when in contact with an aqueous moving phase. The production of water from a subterranean producing zone is disadvantageous, among other reasons, both because of this effect of mobilizing formation sands, and because water production constitutes a major expense in the recovery of hydrocarbons from subterranean formations, especially in light of the energy expended in producing, separating, and disposing of the water. In order to combat these problems of water production, treatment fluids comprising relative permeability modifiers may be pumped into the subterranean formation that, among other things, may block water from entering certain portions of the subterranean formation and/or reduce the water-wettability of certain portions of the subterranean formation. These treatments may, inter alia, reduce the amount of water produced out of the subterranean formation. However, the addition of a separate treatment for applying a relative permeability modifier to a subterranean formation may add cost and complexity to the operations in that formation.

SUMMARY

The present invention relates to the treatment of subterranean formations. More particularly, the present invention relates to methods for stabilizing unconsolidated portions of a subterranean formation and controlling the production of water from those portions.

In one embodiment, the present invention provides a method comprising: providing a consolidating agent; introducing the consolidating agent into an unconsolidated portion of a subterranean formation using a fluid diversion tool; allowing the consolidating agent to at least partially consolidate the unconsolidated portion of the subterranean formation; providing a relative permeability modifier; introducing the relative permeability modifier into the subterranean formation using a fluid diversion tool; and allowing the relative permeability modifier to modify the relative permeability of at least a portion of the subterranean formation.

In another embodiment, the present invention provides a method of treating an unconsolidated portion of a subterranean formation penetrated by a well bore, the method comprising: providing a consolidating agent; introducing the consolidating agent into the well bore using a fluid diversion tool; allowing the consolidating agent to at least partially consolidate the unconsolidated portion of the subterranean formation; providing a relative permeability modifier; introducing the relative permeability modifier into the well bore using a fluid diversion tool; and allowing the relative permeability modifier to modify the relative permeability of at least a portion of the subterranean formation.

In another embodiment, the present invention provides a method of treating an unconsolidated portion of a subterranean formation penetrated by a well bore, the method comprising: providing a consolidating agent; introducing the consolidating agent into the unconsolidated portion of the subterranean formation using a fluid diversion tool; allowing the consolidating agent to at least partially consolidate the unconsolidated portion of the subterranean formation; providing a relative permeability modifier that comprises an amino methacrylate/alkyl ammonium methacrylate copolymer; introducing the relative permeability modifier into the subterranean formation using a fluid diversion tool; and allowing the relative permeability modifier to modify the relative permeability of at least a portion of the subterranean formation.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

FIG. 1 shows a cross-sectional view of a subterranean formation penetrated by a well bore after treatment with a consolidating agent and a relative permeability modifier fluid, in which the consolidating agent has been introduced at a rate and pressure below the fracture pressure of the subterranean formation.

FIG. 2A shows a cross-sectional view of a subterranean formation penetrated by a well bore after treatment with a consolidating agent, followed by treatment with a relative permeability modifier fluid which has been introduced at a rate and pressure sufficient to create or enhance at least one fracture in the subterranean formation.

FIG. 2B shows a cross-sectional view of the subterranean formation of FIG. 2A wherein a fracturing fluid comprising proppant particulates has been used to extend further the fracture into the formation.

DESCRIPTION OF PREFERRED EMBODIMENTS

The present invention relates to the treatment of subterranean formations. More particularly, the present invention relates to methods for stabilizing portions of a subterranean formation and controlling the production of water from those subterranean formations.

I. Methods of the Present Invention

The methods of the present invention generally comprise: providing a consolidating agent; introducing the consolidating agent into an unconsolidated portion of a subterranean formation using a fluid diversion tool; allowing the consolidating agent to at least partially consolidate the unconsolidated portion of the subterranean formation; providing a relative permeability modifier; introducing the relative permeability modifier into the subterranean formation using a fluid diversion tool; and allowing the relative permeability modifier to modify the relative permeability of at least a portion of the subterranean formation. The consolidating agent and/or the relative permeability modifier may be provided and/or introduced into the subterranean formation as components of one or more treatment fluids introduced into the subterranean formation. The term "consolidating agent," is defined herein to include any substance that may consolidate a portion of the subterranean formation, which may, at least in part, stabilize particulates such that loose or weakly-consolidated particulates are prevented from shifting or migrating once the consolidation treatment is complete. The term "relative permeability modifier," and derivatives thereof, are defined herein to include any substance that may, among other things, reduce the relative permeability of the treated portion to aqueous fluids without substantially reducing the formation permeability as to hydrocarbons. The term "fluid diversion tool" is defined herein to include any static or dynamic diversion device that is capable of modifying (e.g., increasing) the velocity and/or direction of the flow of a fluid into a subterranean formation from the velocity and/or direction of the flow of that fluid down a well bore.

The subterranean formations treated in the methods of the present invention may be any subterranean formation wherein at least a plurality of unconsolidated particulates resides in the formation. The subterranean formation may be penetrated by a well bore through which the consolidating agent, relative permeability modifier, and/or other treatment fluids may be introduced. A well bore penetrating the subterranean formation being treated may contain one or more casing strings (e.g., "cased" or "partially cased"), or the well bore may be uncased. Such a well bore optionally may contain one or more screens (e.g., gravel packs) to, inter alia, provide some degree of sand control in the well.

In those embodiments where the portion of the well bore penetrating the portion of the subterranean formation being treated is cased or partially cased, the fluid diversion tool may be used to introduce the consolidating agent, the relative permeability modifier, and/or other fluids into the subterranean formation by directing them through perforations or holes in the casing that allow fluid communication between the interior of the casing and the annulus (i.e., the space between the walls of the well bore and the outer surface of the casing). In certain embodiments, the fluid diversion tool may be used to create those perforations or holes in the casing, for example, by propelling a fluid comprising abrasive materials (e.g., particulate materials such as sand, gravel, degradable and dissolvable particulates, and the like) at the interior surface of the casing and/or propelling a fluid at a sufficiently high pressure at the interior surface of the casing to create the perforations or holes in the casing. In other embodiments, the perforations or holes may be created using some other method or apparatus prior to or during the course of conducting a method of the present invention.

The consolidating agent and the relative permeability modifier may be provided and introduced in the methods of the present invention in any order, and in combination with any other suitable treatment of the subterranean formation as recognized by one skilled in the art with the benefit of this disclosure. In some embodiments, the consolidating agent may be introduced into the subterranean formation after the relative permeability modifier has been introduced into the subterranean formation. In these instances, the consolidating agent and/or a treatment fluid comprising the consolidating agent may, inter alia, displace the relative permeability modifier further into the subterranean formation. In other embodiments, the relative permeability modifier may be introduced into the subterranean formation after the consolidating agent has been introduced into the subterranean formation. In these embodiments, the relative permeability modifier and/or a treatment fluid comprising the relative permeability modifier may, inter alia, displace the consolidating agent further into the subterranean formation, create or enhance one or more fractures in the consolidated portion of the subterranean formation, and/or at least partially restore the permeability of the consolidated portion of the subterranean formation.

The methods of the present invention optionally may include providing and applying one or more preflush fluids into the subterranean formation at any stage of the treatment process. The term "preflush fluid" is defined herein to include any fluid (e.g., a liquid, a gel, a gas, or combination thereof) that may be introduced into a subterranean formation prior to some other process or occurrence in the subterranean formation, and does not require any particular action by or purpose of the preflush fluid. Where used, the preflush fluid may be introduced into the subterranean formation using the fluid diversion tool and/or by some other means suitable for introducing fluids into the subterranean formation. Typically, injection of a preflush fluid may occur at any time before the consolidating agent is introduced into the subterranean formation. In certain embodiments, a preflush fluid may be applied to the subterranean formation, among other purposes, to clean out undesirable substances (e.g., oil, residue, or debris) from the pore spaces in the matrix of the subterranean formation and/or to prepare the subterranean formation for later placement of the consolidating agent. For example, an acidic preflush fluid may be introduced into at least a portion of the subterranean formation that may, inter alia, dissolve undesirable substances in the subterranean formation. Generally, the volume of the preflush fluid introduced into the formation is between 0.1 times to 50 times the volume of the consolidating agent. Examples of preflush fluids that may be suitable for use with the present invention are described in more detail in Section III.A. below.

The methods of the present invention optionally may include providing and applying one or more afterflush fluids into the subterranean formation at any stage of the treatment process. The term "afterflush fluid" is defined herein to include any fluid (e.g., a liquid, a gel, a gas, or combination thereof) that may be introduced into a subterranean formation after some other process or occurrence in the subterranean formation, and does not require any particular action by or purpose of the afterflush fluid. Where used, the afterflush fluid may be introduced into the subterranean formation using the fluid diversion tool and/or by some other means suitable for introducing fluids into the subterranean formation. Typically, injection of an afterflush fluid may occur at any time after the consolidating agent is introduced into the subterranean formation. When used, the afterflush fluid is preferably placed into the subterranean formation while the consolidating agent is still in a flowing state. For example, an afterflush fluid may be placed into the formation prior to a shut-in period. In certain embodiments, an afterflush fluid may be applied to the subterranean formation, among other purposes, to restore the permeability of a portion of the subterranean formation by displacing at least a portion of the consolidating agent from the pore channels therein or forcing the displaced portion of the consolidating agent further into the subterranean formation where it may have negligible impact on subsequent hydrocarbon production. Generally, the volume of afterflush fluid introduced into the subterranean formation ranges from about 0.1 times to about 50 times the volume of the consolidating agent. In some embodiments of the present invention, the volume of afterflush fluid introduced into the subterranean formation ranges from about 0.1 times to about 5 times the volume of the consolidating agent. Examples of afterflush fluids that may be suitable for use with the present invention are described in more detail in Section III.A. below.

According to the methods of the present invention, after placement of the consolidating agent, the subterranean formation may be shut in for a period of time to allow the consolidating agent to transform a portion of the subterranean formation into a consolidated region. The shutting-in of the well bore for a period of time may, inter alia, stabilize unconsolidated portions of the subterranean formation, for example, by enhancing the coating and curing of the resin between formation particulates and minimizing the washing away of the consolidating agent during subsequent treatments (e.g., placement of a relative permeability modifier). Typically, the shut-in period of the well bore occurs after placement of the consolidating agent. In embodiments using an afterflush fluid, the shut-in period preferably occurs after the use of the afterflush fluid. The optional shut-in time period is dependent, among other things, on the composition of the consolidating agent used and the temperature of the formation. Generally, the chosen period of time will be between about 0.5 hours and about 72 hours or longer. Determining the proper period of time to shut in the formation is within the ability of one skilled in the art with the benefit of this disclosure.

Generally, the relative permeability modifier should reduce the permeability of at least a portion of the subterranean formation to water without substantially reducing the hydrocarbon permeability of that portion of the formation. The relative permeability modifier may be introduced into the subterranean formation as a component of a treatment fluid introduced into the subterranean formation. Among other things, a treatment fluid comprising the relative permeability modifier also may displace excess portions of the consolidating agent into the formation and restore the permeability to hydrocarbons of the treated portion. The relative permeability modifier may be introduced into the subterranean formation through the well bore so as to penetrate beyond the portion of the subterranean formation that has been consolidated. For example, the relative permeability modifier may penetrate through the consolidated portion and into portion of the subterranean formation (e.g., unconsolidated portions) that are adjacent to the consolidated region. In certain embodiments, the relative permeability modifier may be introduced into the subterranean formation after an afterflush fluid and/or fracturing treatment has restored the permeability of the consolidated portion of the subterranean formation. In certain embodiments, a fluid comprising the relative permeability modifier may be introduced into the subterranean formation at a rate and pressure sufficient to create or enhance at least one fracture in a portion of the subterranean formation. In certain embodiments, this fracture or fractures may extend from a consolidated portion of the subterranean formation to an unconsolidated portion of the subterranean formation. The fluid comprising a relative permeability modifier may leak off into the unconsolidated portion of the formation along the fracture. In this way, the relative permeability modifier may treat regions of the formation beyond the consolidated portion of the formation. In certain embodiments, an afterflush fluid, as described above, may be introduced into the subterranean formation so as to displace at least a portion of the relative permeability modifier further into the formation.

As an example of one embodiment of the methods of the present invention, FIG. 1 shows a cross-sectional view of subterranean formation 100 penetrated by well bore 110. First portion 120 of subterranean formation 100 has been treated with a consolidating agent using a fluid diversion tool (not shown) to consolidate first portion 120 and form a consolidated region. Prior to the consolidation of first portion 120, an afterflush fluid may optionally be introduced into subterranean formation 100 to restore the permeability of first portion 120 after introduction of the consolidating agent. Further, after introduction of an afterflush fluid, well bore 110 may optionally be shut-in for a period of time to allow for consolidation of first portion 120. Second portion 130 of the subterranean formation 100 may be treated by a relative permeability modifier fluid introduced into subterranean formation through well bore 110 using a fluid diversion tool (not shown) so as to penetrate first portion 120.

As another example of one embodiment of the methods of the present invention, FIG. 2A shows a cross-sectional view of subterranean formation 200 penetrated by well bore 210. First portion 220 of subterranean formation 200 has been treated with a consolidating agent using a fluid diversion tool (not shown) to consolidate first portion 220 and form a consolidated region. A relative permeability modifier fluid has been introduced using a fluid diversion tool (not shown) at a rate and pressure sufficient to create or enhance fracture 240 in subterranean formation 200. The relative permeability modifier fluid may flow into and treat second portion 230. Referring now to FIG. 2B, a fracturing fluid has been introduced at a rate and pressure sufficient to extend fracture 240 in subterranean formation 200. Fracture 240 may be packed with proppant to keep fracture 240 open. In this way, the relative permeability modifier fluid may treat regions that are beyond first portion 220 that have been consolidated using the consolidating agent and extend into second portion 230.

The methods of the present invention may be used to consolidate a single interval in an unconsolidated portion of a subterranean formation, or may be repeated to consolidate several different intervals in a subterranean formation. For example, the fluid diversion tool initially may be positioned within a well bore so as to introduce the consolidating agent into a particular interval in a portion of a subterranean formation, and, after introducing the consolidating agent into that particular interval, may be repositioned so as to introduce the consolidating agent into another interval in the subterranean formation (e.g., an interval closer to the surface than the first interval treated). This process may be repeated for any number of intervals in a subterranean formation. In embodiments where several different intervals are treated, the several intervals may be penetrated by a single well bore, different contiguous well bores, or different well bores that are not contiguous.

The methods of the present invention optionally may comprise performing one or more additional subterranean treatments for a variety of different purposes, for example, to restore the permeability of a portion of the subterranean formation that has undergone a consolidation treatment (including, but not limited to, a consolidation treatment performed according to a method of the present invention). These additional treatments may be performed prior to, during, or subsequent to performing all or some part of a method of the present invention. As used herein, the term "treatment," or "treating," refers to any subterranean operation performed in conjunction with a desired function and/or for a desired purpose. The term "treatment," or "treating," does not imply any particular action.

In certain embodiments, one or more fractures may be created or enhanced in a portion of the subterranean formation, among other purposes, to at least partially restore the permeability of the portion of the subterranean formation and reconnect the well bore with portions of the formation (e.g., the reservoir formation) outside the consolidated region. "Enhancing" one or more fractures in a subterranean formation, as that term is used herein, refers to the extension or enlargement of one or more natural or previously created fractures in the subterranean formation. This fracturing may be accomplished by any means known by a person skilled in the art for creating or enhancing one or more fractures in a subterranean formation. For example, a hydraulic fracturing treatment may be used wherein a fluid (e.g., a fracturing fluid, a fluid comprising the relative permeability modifier) is introduced into the subterranean formation at a pressure sufficient to create or enhance one or more fractures in the formation. In certain embodiments, the fluid used in the hydraulic fracturing treatment may comprise a viscosified fluid (e.g., a fluid comprising a gelling agent, a crosslinked gelling agent, a surfactant, or a combination thereof). In certain embodiments, a fluid (e.g., a fracturing fluid) comprising proppant particulates may be introduced into the subterranean formation, and the proppant particulates therein may be deposited in the fracture, among other purposes, to maintain fluid conductivity of the fracture. The proppant may be coated with a curable resin or consolidating agent to form a hard, permeable solid mass in the fracture or fractures, among other things, to prevent proppant flow back during production from the well.

The proppant also may be blended with fibrous particulates to form a stable network with the proppant and also partially control proppant flow back.

In certain embodiments, the fluid diversion tool may be used to create or enhance one or more fractures in the subterranean formation and/or to expose some obstructed portion of the subterreanean formation to the well bore, for example, by cutting through a gravel-pack or screen residing in the well bore. These treatments may, among other things, restore the permeability of a portion of the subterranean formation. For example, a fluid may be introduced through the fluid diversion tool in such a way that creates or enhances one or more fractures in the formation. In certain embodiments, the fluid diversion tool may be capable of introducing the fluid into the formation at a rate and pressure sufficient to create or enhance one or more fractures in the formation. The fluid introduced with the fluid diversion tool in this manner may comprise abrasive materials (e.g., particulate materials such as sand, gravel, degradable particulates, and the like) that may, inter alia, facilitate the restoration of the permeability of a portion of the formation.

II. Fluid Diversion Tools

The methods of the present invention utilize a fluid diversion tool to introduce the treatment fluids into the subterranean formation. Suitable fluid diversion tools for use in the present invention may comprise any device that is capable of increasing or modifying the velocity and/or direction of the flow of a fluid into a subterranean formation from the velocity and/or direction of the flow of that fluid down a well bore. Depending on the fluid diversion tool used, using the fluid diversion tool to introduce the consolidating agent and/or the relative permeability modifier into the subterranean formation may comprise, among other things, introducing it into the well bore, propelling it into the subterranean formation at a higher rate or speed, propelling the fluid into the subterranean formation in a particular direction, and/or blocking a particular region in the subterranean formation so as to divert the flow of fluid away from that region.

The methods of the present invention optionally may comprise placing a static diverting agent within a portion of the subterranean formation. As used herein, the term "static diverting agent" is defined to include any static diverting agent or tool (e.g., chemicals, fluids, particulates or equipment) that is capable of diverting the flow of fluid away from a particular portion of a subterranean formation to another portion of the subterranean formation. Among other things, the static diverting agent may aid in controlling the placement of the consolidating agent and/or the relative permeability modifier in the desired region of the subterranean formation. The static diverting agent may comprise anything that is capable of diverting the flow of fluid away from a particular region in a subterranean formation, including but not limited to A person skilled in the art, with the benefit of this disclosure will recognize when a static diverting agent should be used in a method of the present invention, as well as the appropriate type of placement of the static diverting agent.

Suitable fluid diversion tools may comprise static diversion tools such as fluids (e.g., aqueous-base and/or non-aqueous-base fluids), emulsions, gels, foams, degradable materials (e.g., polyesters, orthoesters, poly(orthoesters), polyanhydrides, dehydrated organic and/or inorganic compounds), particulates, packers (e.g., pinpoint packers and selective injection packers), ball sealers, pack-off devices, particulates, sand plugs, bridge plugs, and the like. Suitable fluid diversion tools may comprise dynamic diversion tools such as ported-sub assemblies, hydroblast tools, and hydrajetting tools. Examples of suitable fluid diversion tools are described in the following U.S. patents and patent applications, the relevant disclosures of which are incorporated herein by reference: U.S. Pat. No. 5,765,642; U.S. Pat. No. 5,249,628; U.S. Pat. No. 5,325,923; U.S. Pat. No. 5,499,678; U.S. Pat. No. 5,396,957; and U.S. patent application Ser. No. 11/004,441. In certain embodiments, the fluid diversion tool may comprise a pipe string (e.g., coiled tubing, drill pipe, etc.) with at least one port (e.g., nozzle or jet) thereon that is capable of directing the flow of fluid from within the pipe string into a subterranean formation in a desired direction. In certain embodiments, the fluid diversion tool may comprise a pulsonic tool (e.g., a tool capable of applying a pressure pulse having a given amplitude and frequency to a fluid). Examples of suitable pulsonic tools include, but are not limited to, fluidic oscillators, and those devices described in U.S. patent application Ser. No. 10/863,706 by Nguyen, et al., the relevant disclosure of which is incorporated herein by reference. In certain embodiments, the fluid diversion tool may comprise an uncemented liner having jets on the outer surface of the liner.

In certain embodiments of the present invention, two or more fluid diversion tools may be used in combination to introduce the consolidating agent and/or the relative permeability modifier into the subterranean formation, among other purposes, to optimize the placement of the consolidating agent and/or the relative permeability modifier in the subterranean formation. For example, one might use a hydrajetting-type hydraulic diversion tool to initially introduce the consolidating agent and/or the relative permeability modifier into the subterranean formation, and use a plug- or packer-type static diversion tool (e.g., sand plug, gel plug, and the like) to further direct the placement of the consolidating agent and/or the relative permeability modifier.

The selection of a suitable fluid diversion tool for a particular application of the present invention may depend upon a variety of factors, including the rate and/or pressure of fluid flow desired, the structure and/or composition of the subterranean formation, the length of the interval in the subterranean formation being treated, the particular composition of the fluid being pumped, and the like. For example, in certain embodiments, it may not be desirable to use certain types of fluid diversion tools that are capable of propelling fluid at a pressure sufficient to erode and/or fracture a portion of the subterranean formation. However, in certain embodiments, it may be desirable to use certain types of fluid diversion tools that are capable of propelling fluid at a pressure to sufficient to expose some obstructed portion of the subterreanean formation to the well bore, for example, by cutting through a gravel-pack or screen residing in the well bore. One of ordinary skill in the art, with the benefit of this disclosure, will be able to recognize which types of fluid diversion tools are suitable for a particular application of the methods of the present invention.

III. Fluids, Consolidating Agents, and Relative Permeability Modifiers

A. Fluids

In certain embodiments, the consolidating agent and/or the relative permeability modifier may be provided and/or introduced into the subterranean formation as components of one or more treatment fluids introduced into the subterranean formation. These treatment fluids may include any fluid that does not adversely interact with the other components used in accordance with this invention or with the subterranean formation. Such treatment fluids may be aqueous based or non-aqueous based. Aqueous-based treatment fluids may comprise fresh water, salt water, brine, seawater, or a combination thereof. Non-aqueous based treatment fluids may comprise one or more organic liquids, such as hydrocarbons (e.g., kerosene, xylene, toluene, or diesel), oils (e.g., mineral oils or synthetic oils), esters, and the like.

The preflush and afterflush fluids utilized in certain embodiments of the present invention may include any fluid that does not adversely interact with the other components used in accordance with this invention or with the subterranean formation. For example, the preflush or afterflush fluid may be an aqueous-based fluid, a non-aqueous-based fluid (e.g., kerosene, xylene, toluene, diesel, oils, etc.), or a gas (e.g., nitrogen or carbon dioxide). Aqueous-based fluids may comprise fresh water, salt water, brine, or seawater, or any other aqueous fluid that does not adversely react with the other components used in accordance with this invention or with the subterranean formation. In certain embodiments, an aqueous-based preflush or afterflush fluid may comprise a surfactant. Any surfactant compatible with later-used treatments (e.g., the consolidating agent) may be used in the present invention, for example, to aid a consolidating agent in flowing to the contact points between adjacent particulates in the formation. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773, the relevant disclosure of which is incorporated herein by reference. A $C_{12}$-$C_{22}$ alkyl phosphonate surfactant is preferred. The surfactant or surfactants used may be included in the preflush or afterflush fluid in an amount sufficient to prepare the subterranean formation to receive a treatment of a consolidating agent. In some embodiments of the present invention, the surfactant is present in the preflush or afterflush fluid in an amount in the range of from about 0.1% to about 3% by weight of the aqueous fluid.

The treatment fluids, preflush fluids, and/or afterflush fluids utilized in methods of the present invention may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, particulate materials (e.g., proppant particulates) and the like. In certain embodiments the treatment fluids, preflush fluids, and/or afterflush fluids may comprise an activator or catalyst which may be used, inter alia, to activate the polymerization of the consolidating agent. A person skilled in the art, with the benefit of this disclosure, will recognize the types of additives that may be included in the treatment fluids, preflush fluids, and/or afterflush fluids for a particular application.

B. Consolidating Agents

Suitable consolidating agents for the methods at the present invention include any composition that may consolidate a portion of the subterranean formation, which may, at least in part, stabilize unconsolidated particulates such that they are prevented from shifting or migrating. Examples of suitable consolidating agents include resins, tackifying agents, and gelable liquid compositions.

1. Resins

Resins suitable for use as the consolidating agents of the present invention include any suitable resin that is capable of forming a hardened, consolidated mass. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.) but will cure under the effect of time and temperature if the formation temperature is above about 250° F., preferably above about 300° F. Such external catalysts may be introduced into the subterranean formation through the fluid diversion tool (e.g., as a component of a treatment fluid) and/or by some other means (e.g., pumped into the annulus from the surface). It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

2. Tackifying Agents

Tackifying agents suitable for use in the methods of the present invention exhibit a sticky character and, thus, impart a degree of consolidation to unconsolidated particulates in the subterranean formation. The term "tackifying agent" is defined herein to include any composition having a nature such that it is (or may be activated to become) somewhat sticky to the touch. Examples of suitable tackifying agents suitable for use in the present invention include non-aqueous tackifying agents, aqueous tackifying agents, and silyl-modified polyamides.

One type of tackifying agent suitable for use in the present invention is a non-aqueous tackifying agent. An example of a suitable tackifying agent may comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the relevant disclosures of which are herein incorporated by reference.

Non-aqueous tackifying agents suitable for use in the present invention may be either used such that they form non-hardening coating, or they may be combined with a multifunctional material capable of reacting with the non-aqueous tackifying agent to form a hardened coating. A "hardened coating," as used herein, means that the reaction of the tackifying agent with the multifunctional material will result in a substantially non-flowable reaction product that exhibits a higher compressive strength in a consolidated agglomerate than the tackifying agent alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying agent in an amount of from about 0.01 to about 50 percent by weight of the tackifying agent to effect formation of the reaction product. In some preferable embodiments, the multifunctional material is present in an amount of from about 0.5 to about 1 percent by weight of the tackifying compound. Suitable multifunctional materials are described in U.S. Pat. No. 5,839,510, the relevant disclosure of which is herein incorporated by reference.

Solvents suitable for use with non-aqueous tackifying agents include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifying agents suitable for use in the present invention are not significantly tacky when placed onto a particulate, but are capable of being "activated" (that is, destabilized, coalesced, and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator and/or catalyst) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. When used, the activator and/or catalyst may be a component of a treatment fluid comprising the aqueous tackifying agent, or may be introduced into the subterranean formation separately using the fluid diversion tool (e.g., as a component of a treatment fluid) or by some other means.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. Methods of determining suitable aqueous tackifying agents and additional disclosure on aqueous tackifying agents can be found in U.S. patent application Ser. No. 10/864,061, filed Jun. 9, 2004, and U.S. patent application Ser. No. 10/864,618, filed Jun. 9, 2004, the relevant disclosures of which are hereby incorporated by reference.

Silyl-modified polyamide compounds suitable for use in the tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the relevant disclosure of which is herein incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl(meth)acrylates and their quaternary addition and acid salts, acrylamide, N-(dialkyl amino alkyl)acrylamide, methacrylamides and their quaternary addition and acid salts, hydroxy alkyl(meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

3. Gelable Liquid Compositions

Gelable liquid compositions suitable for use in the methods of the present invention may comprise any gelable liquid composition capable of converting into a gelled substance capable of substantially plugging the permeability of the formation while allowing the formation to remain flexible. That is, the gelled substance should negatively impact the ability of the formation to produce desirable fluids such as hydrocarbons. As discussed above, the permeability of the formation may be restored through use of an afterflush fluid or by fracturing through the consolidated portion. As referred to herein, the term "flexible" refers to a state wherein the treated formation or material is relatively malleable and elastic and able to withstand substantial pressure cycling without substantial breakdown of the formation. Thus, the resultant gelled substance should be a semi-solid, immovable, gel-like substance, which, among other things, stabilizes the treated portion of the formation while allowing the formation to absorb the stresses created during pressure cycling. As a result, the gelled substance may aid in preventing breakdown of the formation both by stabilizing and by adding flexibility to the formation sands. Examples of suitable gelable liquid compositions include, but are not limited to, resin compositions that cure to form flexible gels, gelable aqueous silicate compositions, crosslinkable aqueous polymer compositions, and polymerizable organic monomer compositions.

Certain embodiments of the gelable liquid compositions comprise curable resin compositions. Curable resin compositions are well known to those skilled in the art and have been used to consolidate portions of unconsolidated formations and to consolidate proppant materials into hard, permeable masses. While the curable resin compositions used in accordance with the present invention may be similar to those previously used to consolidate sand and proppant into hard, permeable masses, they are distinct in that resins suitable for use with the present invention do not cure into hard, permeable masses; rather they cure into flexible, gelled substances. That is, suitable curable resin compositions form resilient gelled substances between the particulates of the treated zone of the unconsolidated formation and thus allow that portion of the formation to remain flexible and to resist breakdown. It is not necessary or desirable for the cured resin composition to solidify and harden to provide high consolidation strength to the treated portion of the formation. On the contrary, upon being cured, the curable resin compositions useful in accordance with this invention form semi-solid, immovable, gelled substances.

Generally, the curable resin compositions useful in accordance with the present invention may comprise a curable resin, a diluent, and a resin curing agent. When certain resin curing agents, such as polyamides, are used in the curable resin compositions, the compositions form the semi-solid, immovable, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of curable resins that can be used in the curable resin compositions of the present invention include, but are not limited to, organic resins such as polyepoxide resins (e.g., bisphenol A-epichlorihydrin resins), polyester resins, ureaaldehyde resins, furan resins, urethane resins, and mixtures thereof. Of these, polyepoxide resins are preferred.

Any diluent that is compatible with the curable resin and achieves the desired viscosity effect is suitable for use in the present invention. Examples of diluents that may be used in the curable resin compositions of the present invention include, but are not limited to, phenols; formaldehydes; furfuryl alcohols; furfurals; alcohols; ethers such as butyl glycidyl ether and cresyl glycidyl etherphenyl glycidyl ether; and mixtures thereof. In some embodiments of the present invention, the diluent comprises butyl lactate. The diluent may be used to reduce the viscosity of the curable resin composition to from about 3 to about 3,000 centipoises ("cP") at 80° F. Among other things, the diluent acts to provide flexibility to the cured composition. The diluent may be included in the curable resin composition in an amount sufficient to provide the desired viscosity effect. Generally, the diluent used is included in the curable resin composition in amount in the range of from about 5% to about 75% by weight of the curable resin.

Generally, any resin curing agent that may be used to cure an organic resin is suitable for use in the present invention. When the resin curing agent chosen is an amide or a polyamide, generally no flexibilizer additive will be required because, inter alia, such curing agents cause the curable resin composition to convert into a semi-solid, immovable, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the curable resin composition, whether a flexibilizer additive is included or not, in an amount in the range of from about 5% to about 75% by weight of the curable resin. In some embodiments of the present invention, the resin curing agent used is included in the curable resin composition in an amount in the range of from about 20% to about 75% by weight of the curable resin.

As noted above, flexibilizer additives may be used, inter alia, to provide flexibility to the gelled substances formed from the curable resin compositions. The term "flexibilizer additive" is defined herein to include any substance that is capable of imparting properties of flexibility (e.g., malleability, elasticity) to the gelled substances formed from the curable resin compositions. Flexibilizer additives should be used where the resin curing agent chosen would cause the organic resin composition to cure into a hard and brittle material instead of the desired gelled substances described herein. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof. Of these, ethers, such as dibutyl phthalate, are preferred. Where used, the flexibilizer additive may be included in the curable resin composition in an amount in the range of from about 5% to about 80% by weight of the curable resin. In some embodiments of the present invention, the flexibilizer additive may be included in the curable resin composition in an amount in the range of from about 20% to about 45% by weight of the curable resin.

In other embodiments, the gelable liquid compositions may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprises an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, immovable, gelled substance described above. Selection of a temperature activated catalyst is related, at least in part, to the temperature of the subterranean formation to which the gelable aqueous silicate composition will be introduced. The temperature activated catalysts which can be used in the gelable aqueous silicate compositions of the present invention include, but are not limited to, ammonium sulfate, which is most suitable in the range of from about 60° F. to about 240° F.; sodium acid pyrophosphate, which is most suitable in the range of from about 60° F. to about 240° F.; citric acid, which is most suitable in the range of from about 60° F. to about 120° F.; and ethyl acetate, which is most suitable in the range of from about 60° F. to about 120° F. Generally, the temperature activated catalyst is present in the gelable aqueous silicate composition in the range of from about 0.1% to about 5% by weight of the gelable aqueous silicate composition. When used, the temperature activated catalyst may be a component of a treatment fluid comprising the gelable acqueous silicate composition, or may be introduced into the subterranean formation separately using the fluid diversion tool (e.g., as a component of a treatment fluid) or by some other means.

In other embodiments, the gelable liquid compositions may comprise crosslinkable aqueous polymer compositions. Generally, suitable crosslinkable aqueous polymer compositions may comprise an aqueous solvent, a crosslinkable polymer, and a crosslinking agent.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions of the present invention may further comprise a crosslinking agent for crosslinking the crosslinkable polymers to form the desired gelled substance. In some embodiments, the crosslinking agent may be a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of the present invention in an amount sufficient to provide, inter alia, the desired degree of crosslinking. In some embodiments of the present invention, the crosslinking agent is present in the crosslinkable aqueous polymer compositions of the present invention in an amount in the range of from 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agents derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

In other embodiments, the gelled liquid compositions may comprise polymerizable organic monomer compositions. Generally, suitable polymerizable organic monomer compositions may comprise an aqueous-base fluid, a water-soluble polymerizable organic monomer, an oxygen scavenger, and a primary initiator.

The aqueous-base fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidepropyltriethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer(s) are included in the polymerizable organic monomer composition in an amount in the range of from about 1% to about 30% by weight of the aqueous-base fluid. In another embodiment of the present invention, the water-soluble polymerizable organic monomer(s) are included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used, inter alia, to initiate polymerization of the water-soluble polymerizable organic monomer(s) used in the present invention. Any compound or compounds which form free radicals in aqueous solution may be used as the primary initiator. The free radicals act, inter alia, to initiate polymerization of the water-soluble polymerizable organic monomer(s) present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-imidazole-2-hydroxyethyl)propane, 2,2'-azobis(2-aminopropane), 4,4'-azobis(4-cyanovaleric acid), and 2,2'-azobis(2-methyl-N-(2-hydroxyethyl)propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s).

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Optionally, the polymerizable organic monomer compositions of the present invention further may comprise a crosslinking agent for crosslinking the polymerizable organic monomer compositions in the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

C. Relative Permeability Modifiers

The relative permeability modifiers used in the present invention may comprise any material capable of reducing the relative permeability of a subterranean formation to aqueous fluids without substantially reducing the permeability of the subterranean formation to hydrocarbons. After introducing the relative permeability modifier fluid into a portion of the subterranean formation, the relative permeability modifier may attach to surfaces within the same spaces in the subterranean formation, so as to reduce the permeability of the portion of the subterranean formation to aqueous fluids without substantially changing its permeability to hydrocarbons. Examples of relative permeability modifiers suitable for use in the present invention include those described in U.S. patent application Ser. Nos. 10/440,337, 10/760,443, and 10/612,271, the relevant disclosures of which are herein incorporated by reference.

Examples of suitable relative permeability modifiers include water-soluble polymers with or without hydrophobic or hydrophilic modification. As used herein, "water-soluble" refers to at least 0.01 weight percent soluble in distilled water. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included in the relative modifier fluids of the present invention.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized using any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming hydrophobically modified polymers of the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly (methacrylic acid/dimethylaminoethyl methacrylate), poly (2-acrylamido-2-methyl propane sulfonic acid/dimethylaminoethyl methacrylate), poly(acrylamide/ dimethylaminopropyl methacrylamide), poly(acrylic acid/ dimethylaminopropyl methacrylamide), and poly (methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction is an amino methacrylate/alkyl ammonium methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer. In another embodiment of the present invention, the relative permeability modifier fluid of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

In another embodiment of the present invention, the water-soluble relative permeability modifiers comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

Sufficient concentrations of a suitable relative permeability modifier may be used in the present invention to provide the desired degree of diversion. The amount of the relative permeability modifier to include depends on a number of factors including, the composition of the fluid to be diverted and the porosity of the formation. In some embodiments, a relative permeability modifier may be present in a treatment fluid of the present invention in an amount in the range of from about 500 parts per million ("ppm") to about 10,000 ppm by volume of the treatment fluid comprising the relative permeability modifier. In certain embodiments of the present invention, the relative permeability modifier may be provided in a concentrated aqueous solution prior to its combination with the other components of a treatment fluid.

In embodiments where the relative permeability modifier is provided and/or introduced into the formation as a component of a treatment fluid, treatment fluid may comprise an aqueous salt solution. The aqueous solution may comprise one or more salts, including but not limited to potassium chloride, sodium chloride, calcium chloride, or a derivative thereof. In certain embodiments, the salt(s) may be included in an amount in the range of from about 2% to about 10% by weight of the aqueous salt solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a consolidating agent;
   introducing the consolidating agent into an unconsolidated portion of a subterranean formation using a fluid diversion tool;
   allowing the consolidating agent to at least partially consolidate the unconsolidated portion of the subterranean formation;
   providing a relative permeability modifier;
   introducing the relative permeability modifier into the subterranean formation using a fluid diversion tool; and
   allowing the relative permeability modifier to modify the relative permeability of at least a portion of the subterranean formation.

2. The method of claim 1 wherein the consolidating agent is selected from the group consisting of resins, tackifying agents, gelable liquid compositions, derivatives thereof and combinations thereof.

3. The method of claim 1 wherein the relative permeability modifier is selected from the group consisting of water-soluble hydrophobically modified polymers, water-soluble hydrophilically modified polymers; water-soluble polymers without hydrophobic or hydrophilic modification, derivatives thereof and combinations thereof.

4. The method of claim 1 wherein the relative permeability modifier comprises an amino methacrylate/alkyl amino methacrylate copolymer.

5. The method of claim 1 wherein the fluid diversion tool comprises a joint of pipe and at least one port that is capable of directing the flow of fluid into a subterranean formation in a desired direction.

6. The method of claim 1 wherein introducing the relative permeability modifier into the subterranean formation occurs after introducing the consolidating agent into an unconsolidated portion of a subterranean formation.

7. The method of claim 1 wherein introducing the consolidating agent comprises introducing a treatment fluid that comprises the consolidating agent into an unconsolidated portion of the subterranean formation using the fluid diversion tool.

8. The method of claim 1 wherein introducing the relative permeability modifier comprises introducing a treatment fluid that comprises the relative permeability modifier into the subterranean formation using the fluid diversion tool.

9. The method of claim 8 wherein the treatment fluid that comprises the relative permeability modifier is introduced into the subterranean formation at or above a pressure sufficient to create or enhance at least one fracture in a portion of the subterranean formation.

10. The method of claim 1 further comprising introducing one or more preflush fluids into the subterranean formation.

11. The method of claim 1 further comprising introducing one or more afterflush fluids into the subterranean formation.

12. The method of claim 1 further comprising displacing the consolidating agent from the portion of the subterranean formation that has been at least partially consolidated by the consolidating agent.

13. The method of claim 1 further comprising introducing a treatment fluid into the subterranean formation at or above a pressure sufficient to create or enhance at least one fracture in a portion of the subterranean formation.

14. The method of claim 13 wherein introducing the treatment fluid into the subterranean formation at or above a pressure sufficient to create or enhance at least one fracture in a portion of the subterranean formation comprises introducing the treatment fluid using the fluid diversion tool.

15. The method of claim 13 wherein the treatment fluid further comprises a plurality of proppant particulates.

16. A method of treating an unconsolidated portion of a subterranean formation penetrated by a well bore, the method comprising:
    providing a consolidating agent;
    introducing the consolidating agent into the well bore using a fluid diversion tool;
    allowing the consolidating agent to at least partially consolidate the unconsolidated portion of the subterranean formation;
    providing a relative permeability modifier;
    introducing the relative permeability modifier into the well bore using a fluid diversion tool; and
    allowing the relative permeability modifier to modify the relative permeability of at least a portion of the subterranean formation.

17. The method of claim 16 wherein one or more casing strings or screens resides in the well bore.

18. The method of claim 16 wherein the fluid diversion tool comprises a joint of pipe and at least one port that is capable of directing the flow of fluid into a subterranean formation in a desired direction.

19. A method of treating an unconsolidated portion of a subterranean formation penetrated by a well bore, the method comprising:
    providing a consolidating agent;
    introducing the consolidating agent into the unconsolidated portion of the subterranean formation using a fluid diversion tool;
    allowing the consolidating agent to at least partially consolidate the unconsolidated portion of the subterranean formation;
    providing a relative permeability modifier that comprises an amino methacrylate/alkyl amino methacrylate copolymer;
    introducing the relative permeability modifier into the subterranean formation using a fluid diversion tool; and
    allowing the relative permeability modifier to modify the relative permeability of at least a portion of the subterranean formation.

20. The method of claim 19 wherein the fluid diversion tool comprises a joint of pipe and at least one port that is capable of directing the flow of fluid into a subterranean formation in a desired direction.

* * * * *